United States Patent [19]
Yoshida et al.

[11] Patent Number: 5,273,228
[45] Date of Patent: Dec. 28, 1993

[54] APPARATUS FOR CONTINUOUSLY UNWINDING A PLURALITY OF ROLLED-UP TAPES

[75] Inventors: Kiyomi Yoshida; Fumiyuki Iwano; Kojiro Hayashi, all of Tokushima, Japan

[73] Assignee: Shikoku Kakoki Co., Ltd., Itano, Japan

[21] Appl. No.: 749,341

[22] Filed: Aug. 23, 1991

[30] Foreign Application Priority Data

Aug. 24, 1990 [JP] Japan ................. 2-222707

[51] Int. Cl.⁵ .................. B65N 19/18; B65N 23/188
[52] U.S. Cl. ...................... 242/58.1; 156/157; 156/502; 242/58.4; 242/58.5
[58] Field of Search ............ 242/58.1, 58.4, 58.5; 156/502, 157

[56] References Cited

U.S. PATENT DOCUMENTS

| | | | |
|---|---|---|---|
| 3,645,463 | 2/1972 | Helm | 242/58.1 |
| 3,841,944 | 10/1974 | Harris | 242/58.1 X |
| 4,157,934 | 6/1979 | Ryan et al. | 242/58.5 X |
| 4,190,483 | 2/1980 | Ryan et al. | 242/58.5 X |
| 4,222,533 | 9/1980 | Pongracz | 156/502 X |
| 4,481,053 | 11/1984 | Tokuno et al. | 242/58.4 X |
| 4,848,691 | 7/1989 | Muto et al. | 242/58.1 |

FOREIGN PATENT DOCUMENTS

1-176757  7/1989  Japan .................. 242/58.1

Primary Examiner—Daniel P. Stodola
Assistant Examiner—William Stryjewski
Attorney, Agent, or Firm—Armstrong, Westerman, Hattori, McLeland & Naughton

[57] ABSTRACT

An apparatus for continuously unwinding a plurality of rolled-up tapes made of fusible material wherein the tapes are successively unwound, one at a time, from at least two rewinders for supporting the tape thereon, with the tail end of the preceding tape joined to the leading end of the following tape. The apparatus comprises a guide roller assembly for transporting the preceding tape via a joining station, a tape end sensor for detecting the tail end of the preceding tape, and a joining device for holding the following tape at its leading end as folded over and opposed to the preceding tape, thermally bonding the tail end of the preceding tape to the folded-over leading end of the following tape in response to a detection signal from the tape end sensor, and cutting off a portion of the resulting joint with only a required length thereof left uncut.

5 Claims, 10 Drawing Sheets

APPARATUS FOR CONTINUOUSLY UNWINDING A PLURALITY OF ROLLED-UP TAPES

BACKGROUND OF THE INVENTION

The present invention relates to an apparatus for continuously unwinding rolled-up tapes, for example, seal tapes for covering container blanks of paper base laminate over an end face thereof.

Apparatus of the type mentioned and heretofore known include one which comprises at least two rewinders for individually supporting rolled-up tapes of fusible material, means for unwinding the tapes from the rewinders successively one at a time, and means for joining the tail end of one of the tapes unwound first to the leading end of the following tape. The joining means comprises a pair of rollers arranged on opposite sides of a tape unwinding path and movable toward and away from each other. An adhesive tape is manually affixed to the leading end of the following tape, and the rollers are moved toward each other to join the tail end of the preceding tape to the leading end of the following tape with the adhesive tape. An excessive portion of the preceding tape is then manually cut off from its tail end with scissors.

With the above apparatus, the joining work is performed chiefly manually and therefore invariably involves errors. Although the excessive portion of the tape is to be cut off with scissors as described above, it is difficult to completely remove the excessive portion. If a large portion of the tape is left unremoved, the remaining portion will cause trouble to the work of the subsequent process.

SUMMARY OF THE INVENTION

An object of the present invention is to provide an apparatus free of the foregoing problem for continuously unwinding a plurality of rolled-up tapes.

The present invention provides an apparatus for continuously unwinding a plurality of rolled-up tapes made of fusible material wherein the tapes are successively unwound, one at a time, from at least two rewinders for supporting the tape thereon, with the tail end of the preceding tape joined to the leading end of the following tape, the apparatus comprising transport means for transporting the preceding tape via a joining station, a tape end sensor for detecting the tail end of the preceding tape, and joining means for holding the following tape at its leading end as folded over and opposed to the preceding tape, thermally bonding the tail end of the preceding tape to the folded-over leading end of the following tape in response to a detection signal from the tape end sensor, and cutting off a portion of the resulting joint with only a required length thereof left uncut.

With the unwinding apparatus of the present invention, the tail end of the preceding tape and the leading end of the following tape are fused together as fitted over each other in the form of a flap, and the resulting tape joint is partly cut off with only a required length thereof left uncut. Accordingly, the two tapes can be thermally joined together reliably, with an excessively portion cut off completely without the necessity of manually affixing an adhesive tape to one of the tapes.

DESCRIPTION OF THE PREFERRED EMBODIMENT

An embodiment of the present invention will be described below with reference to the drawings.

In the following description, the terms "front" and "rear" are used based on FIG. 1; the front side of FIG. 1 (the left-hand side of FIGS. 5 and 6) will be referred to as front, and the opposite side thereof as rear. The terms "right" and "left" are used as the apparatus is viewed as illustrated in FIG. 1.

Figure 1:
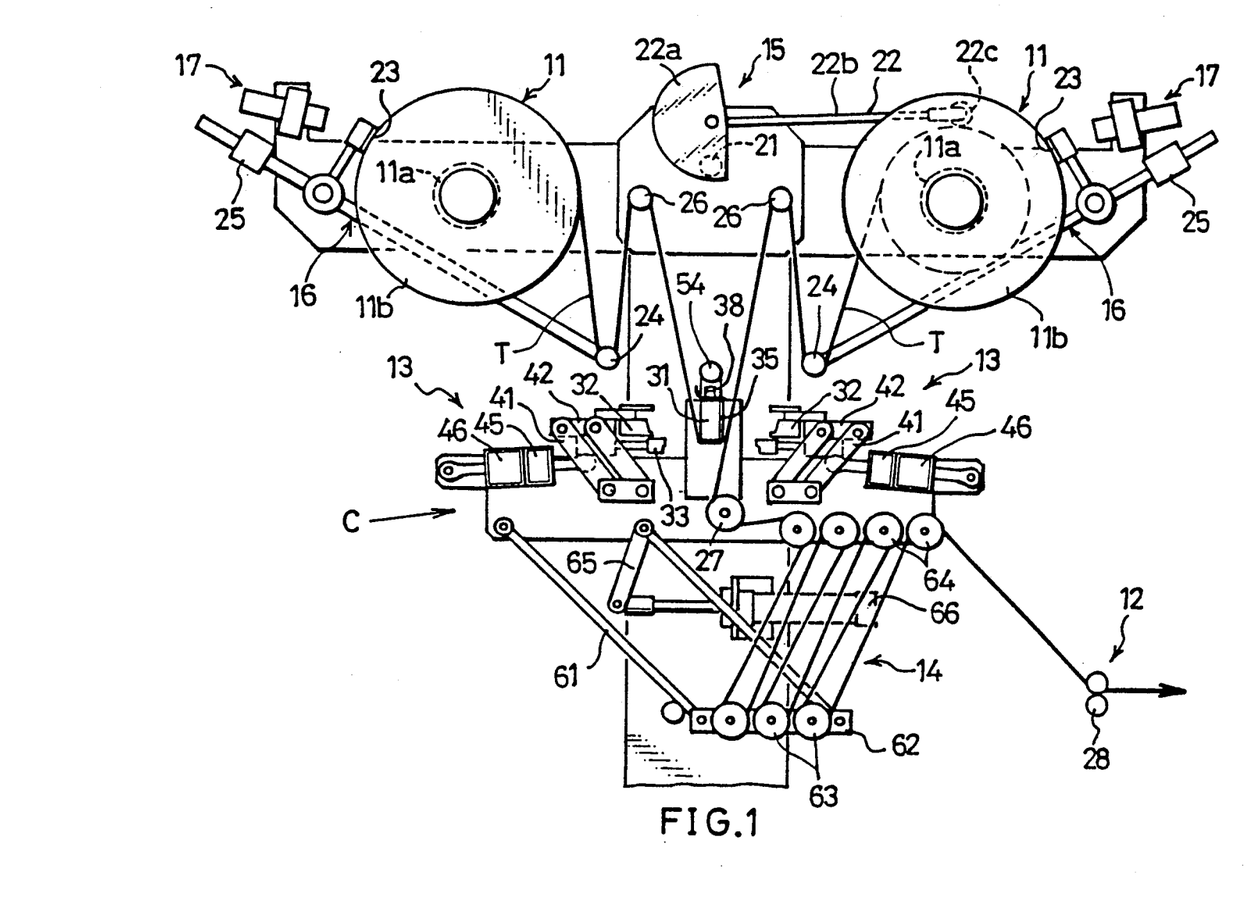
FIG. 1 is a front view showing an apparatus of the invention in its entirety.
Figure 2:
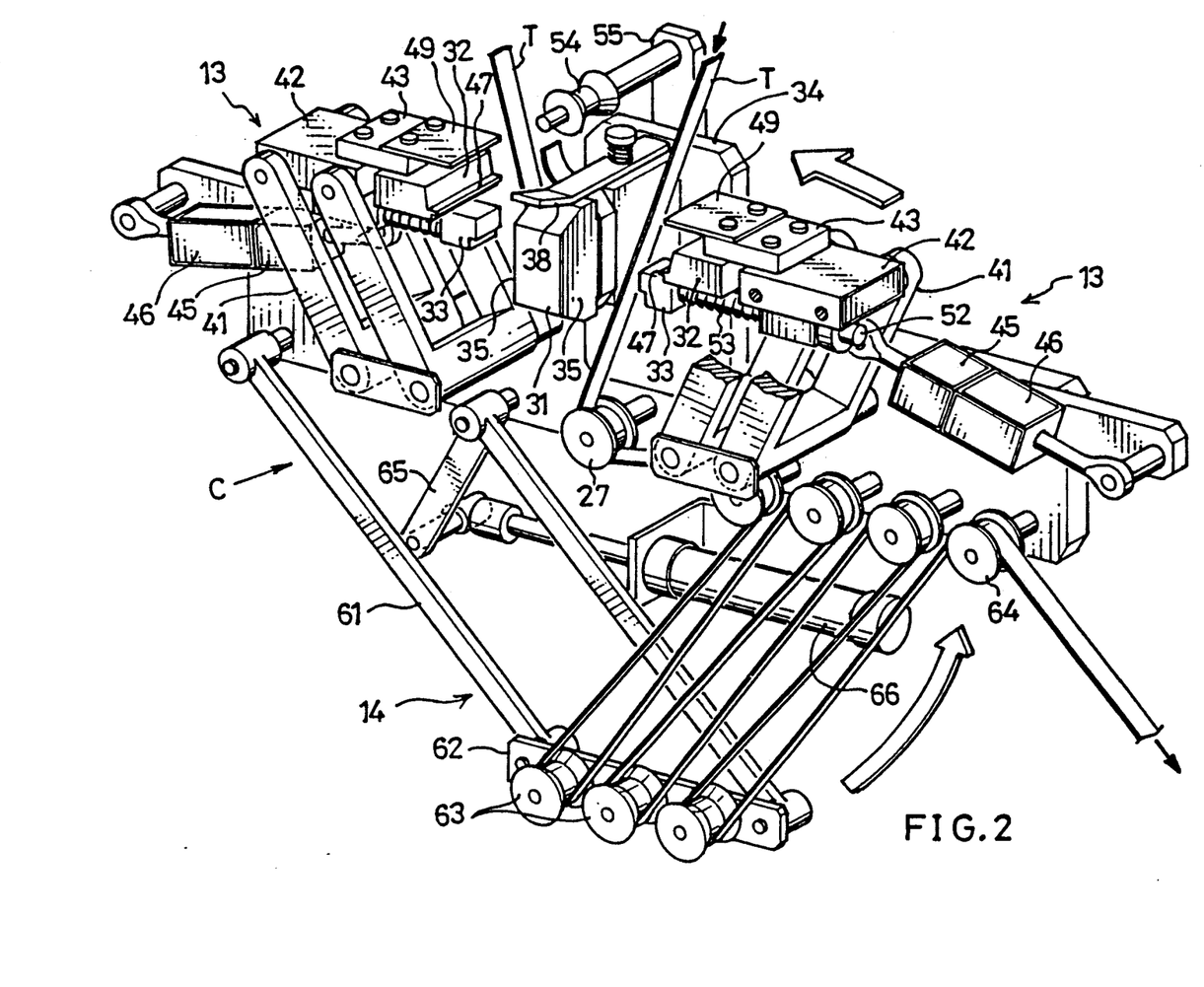
FIG. 2 is a fragmentary perspective view of the apparatus.
Figure 3:
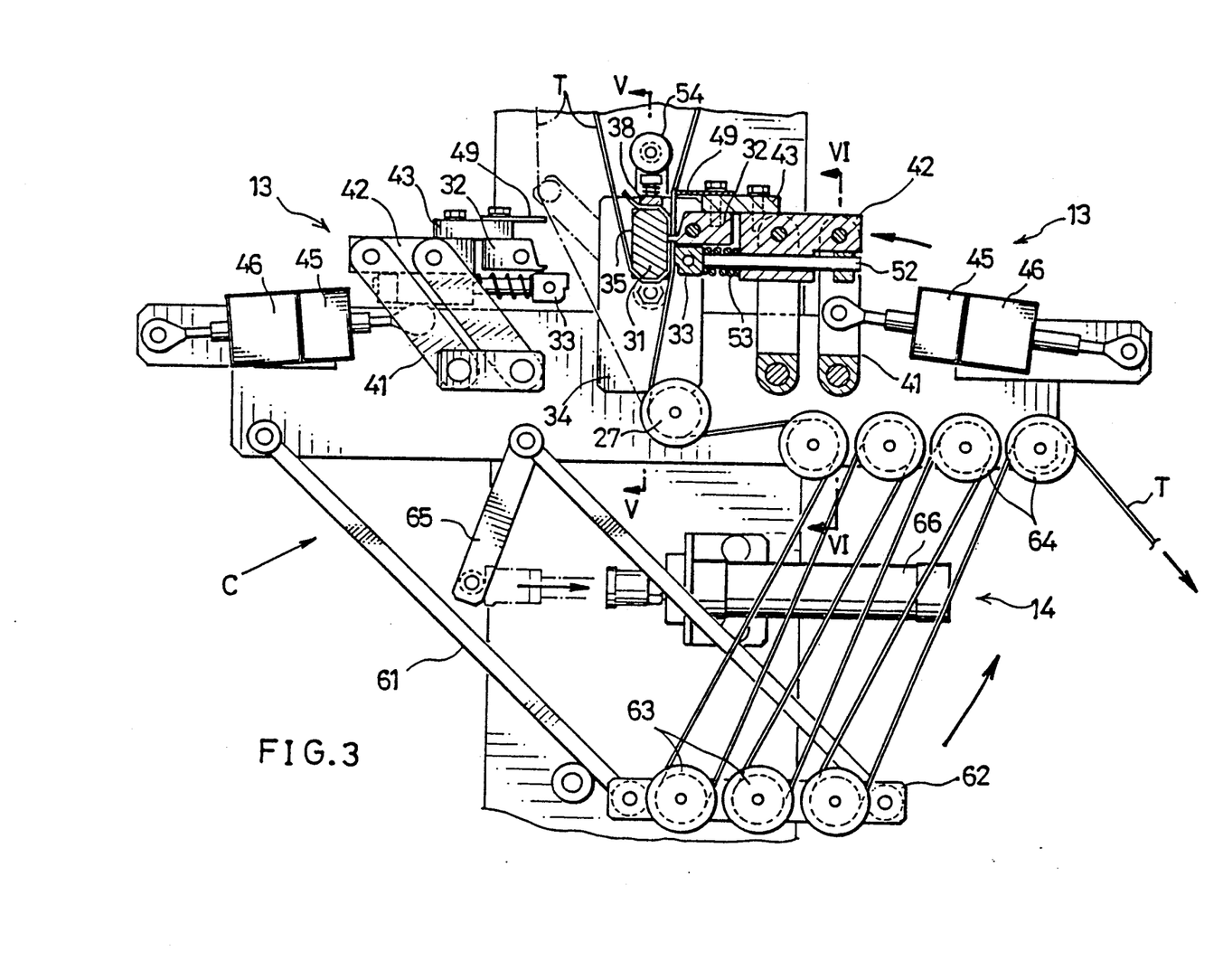
FIG. 3 is a fragmentary front view partly broken away and showing the same.

Referring to FIG. 1, the illustrated unwinding apparatus comprises right and left two rewinders 11 each for supporting a rolled-up tape T made of fusible material, a feeder 12 for unwinding the tapes T from the two rewinders 11 successively, one at a time, and transporting the tape T via a joining station C, joining means 13 for joining the tail end of the preceding tape T to the leading end of the following tape T at the joining station C, and an accumulator 14 for accumulating the tape T along a zigzag path so as to continuously feed the tape T to a container forming section without any interruption while the tapes are being joined together by the means 13.

Each rewinder 11 comprises a horizontal drum 11a and opposed end flanges 11b. The tail end of the tape T is fixed to the drum 11a.

A single tape diminution sensor 15 is provided for use with the two rewinders 11 in common. Each of the two rewinders 11 is provided with a brake lever 16 and a tape end sensor 17. The brake levers 16, as well as the tape end sensors 17, at right and left are identical in construction although directed in directions opposite to each other, so that the brake lever 16 and the tape end sensor 17 at right only will be described below.

The tape diminution sensor 15 comprises a proximity sensor 21 disposed between two rewinders 11, and an actuator 22 for the sensor. The actuator 22 comprises a semicircular plate 22a disposed above the proximity sensor 21 and pivotably supported by a horizontal pin, and a pivotal arm 22b extending from the plate 22a and carrying a roller 22c at its forward end. The roller 22c bears from above on the tape T wound on the rewinder 11 in use, and the actuator 22 rotates clockwise (when operating for the tape on the right rewinder) as the tape T diminishes. When the quantity of remaining tape T decreases below a predetermined value, the proximity sensor 21 detects this.

The brake lever 16 is an L-shaped lever disposed behind the rewinder 11 and supported by a horizontal pin. The brake lever 16 is provided at its one end with a brake shoe 23 in contact with the flanges 11b of the rewinder 11 and at the other end thereof with a tension roller 24, which bears on a portion of the tape T immediately downstream from the rewinder 11. A balance weight 25 is attached to the brake lever 16 at its support point. The tape end sensor 17 comprises a proximity sensor disposed at the right side of the brake shoe 23 thereabove so as to be opposed to the shoe obliquely.

The feeder 12 comprises two upper guide rollers 26 positioned between the two rewinders 11 above the joining station C, a lower guide roller 27 disposed immediately upstream from the accumulator 14 below the joining station C, and a pair of feed pinch rollers 28 disposed immediately downstream from the accumulator 14.

The joining means 13 comprises a joining block 31 fixedly provided between the lower guide roller 27 and the upper guide rollers 26 at a position slightly lower than the middle of the vertical distance therebetween, two movable pressing members 32 arranged at the respective sides of the joining block 31, and two holding members 33 arranged immediately below the respective pressing members 32. The movable pressing members 32, as well as the holding members 33, at right and left are identical in construction although oriented in directions opposite to each other, so that only the pressing member 32 and the holding member 33 at right will be described below.

Figure 4:
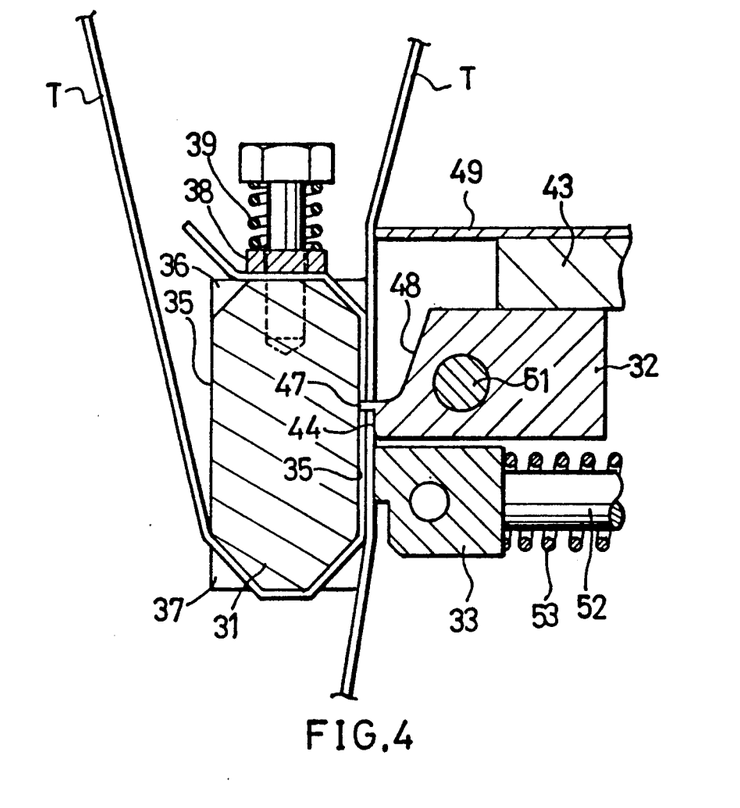
FIG. 4 is an enlarged view in section and showing part of FIG. 3.
Figure 5:
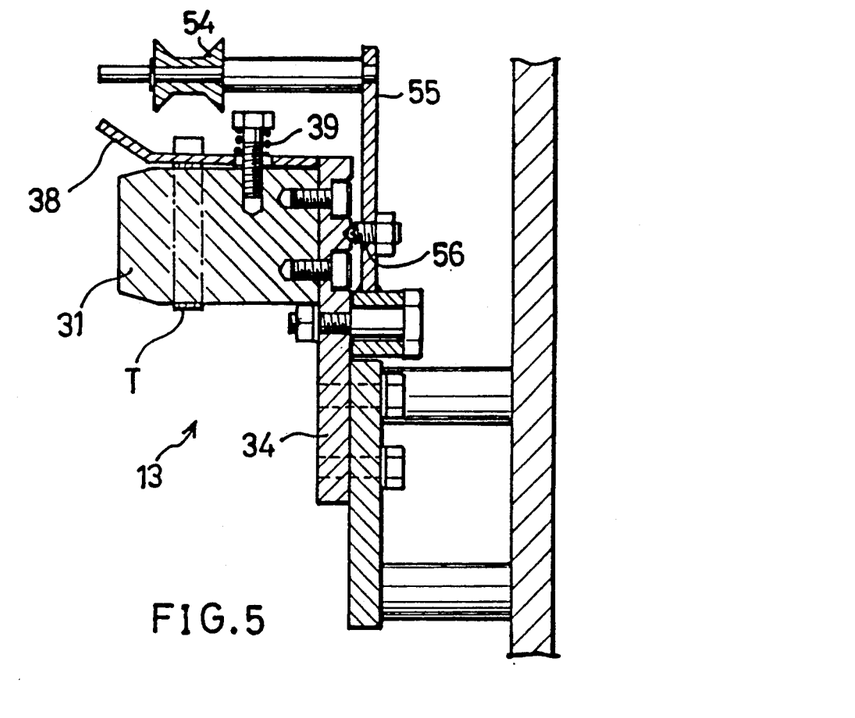
FIG. 5 and FIG. 6 are enlarged views in section taken along the line V—V and the line VI—VI in FIG. 3, respectively.
Figure 6:
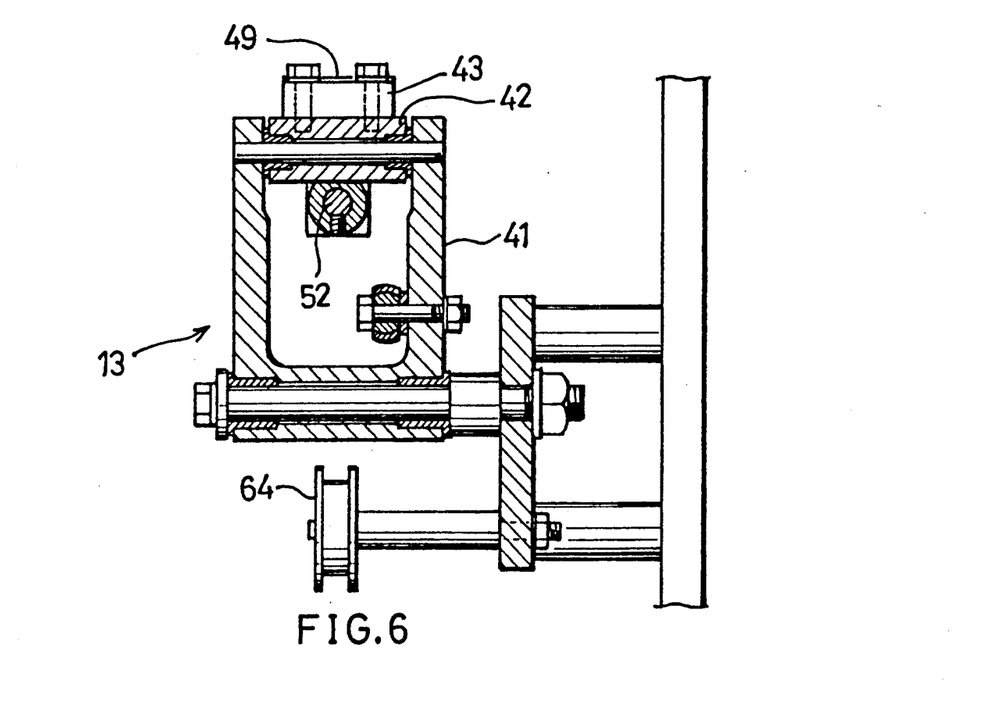

The joining block 31 is a vertically elongated rectangular parallelepiped attached only at its rear end to a vertical support plate 34 and has press faces 35 provided by the respective right and left side surfaces thereof. With reference to FIGS. 4 and 5, the top and the bottom of the joining block 31 are formed with tape guide grooves 36, 37, respectively. A holder 38 biased downward by a spring 39 is mounted on the top of the joining block 31.

The movable pressing member 32 is in the form of a rectangular block attached by a mount plate 43 to a movable member 42 interconnecting the upper ends of upper parallel links 41. The pressing member 32 has a left side surface opposed to the tape T and providing a press face 44 at its lower edge portion (FIG. 4). The assembly of upper parallel links 41 has connected thereto one of the piston rods of two hydraulic cylinders 45, 46 connected together as oriented in opposite directions to each other for operating the joining means 13. As seen in greater detail in FIG. 4, the press face 44 is formed at its upper end with a horizontal cutting ridge 47, above which the member 32 has a recess 48 for avoiding interference thereof with the tape T. A pusher plate 49 extending over the ridge 47 is attached to the upper surface of the mount plate 43. The movable pressing member 32 has a heater 51 in the form of a round rod and embedded therein. The holding member 33 is fixed to the left end of a rod 52 which is movable horizontally laterally. The movable rod 52 is slidably supported by the movable member 42 and biased leftward by a spring 53. A tape retracting roller 54 disposed above the joining block 31 is mounted on the forward end of a pivotal arm 55. As shown in FIG. 5, the pivotal arm 55 is provided with a positioning member 56 for locking the arm at a desired angle.

The accumular 14 comprises three movable rollers 63 arranged side by side and mounted on a movable plate 62 interconnecting the lower ends of lower parallel links 61, and four fixed rollers 64 spaced from these rollers 63 and arranged approximately at the same level as the lower guide roller 27. A stopper arm 65 is fixed to one of the lower parallel links 61. A hydraulic cylinder 66 for operating the accumulator 14 has a piston rod which is so positioned as to come into contact with the free end of the stopper arm 65.

The tapes T are joined together by the operation to be described below with reference to FIG. 7 to FIG. 11.

Figure 7:
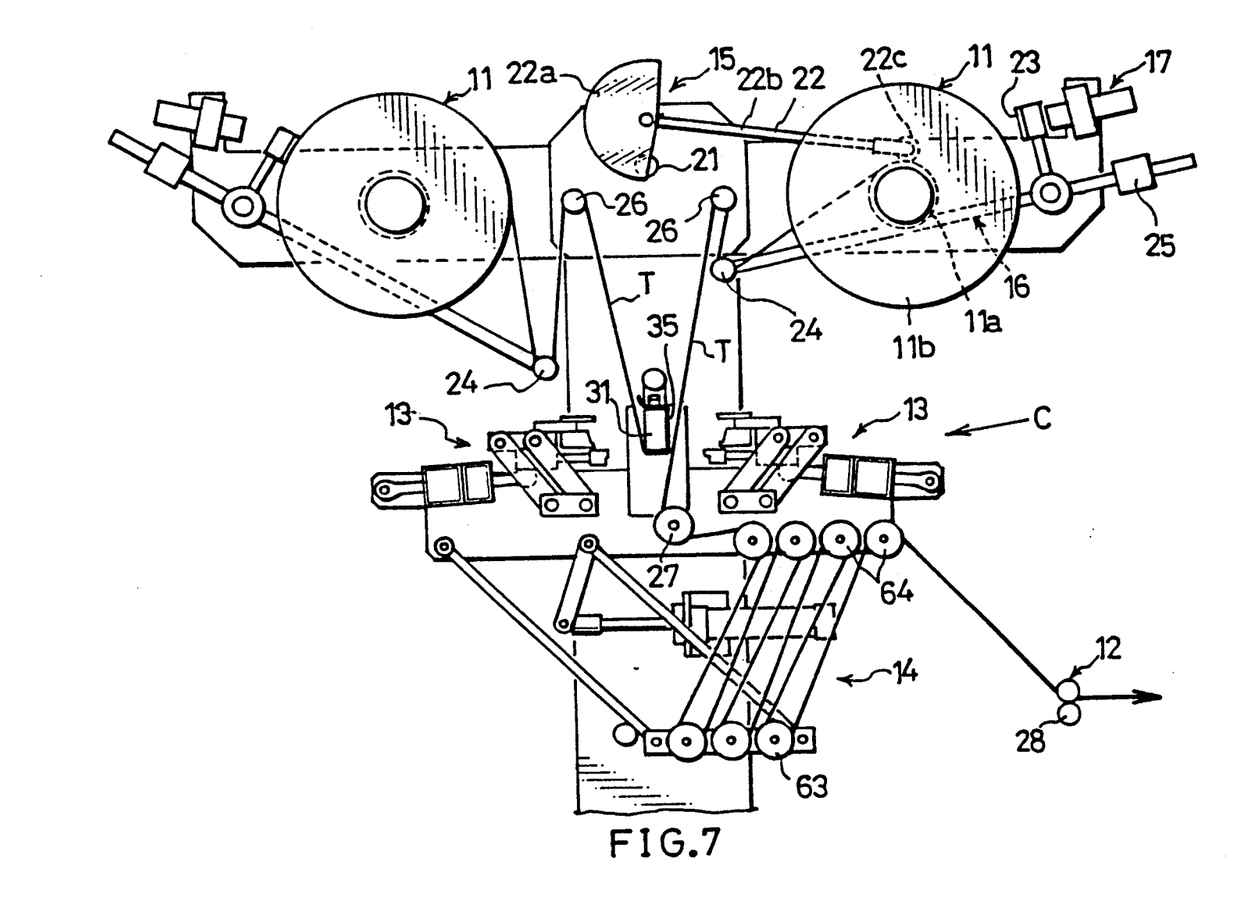
FIG. 7 to FIG. 11 are views for illustrating a joining operation stepwise.

Referring to FIG. 7, the tape T to be unwound next is supported on the left rewinder 11. This tape T is reeved around the left tension roller 24 and then around the left upper guide roller 26, made to extend to the location of the joining block 31, passed along the left side of the block 31 and then around the lower side thereof so as to be fitted in the guide grooves 36, 37, and has its leading end held between the joining block 31 and the holder 38, whereby the leading end of the tape T is folded over. The folded-over portion is positioned over the right press face 35 of the block 31.

Fixed to the right rewinder 11 is the tail end of the tape T immediately after unwinding. This tape T is reeved around the right tension roller 24 and then around the right upper guide roller 26, passed along the right side of the joining block 31, guided to the location of the lower guide roller 27, reeved around this roller 27 and thereafter around the fixed rollers 64 and the movable rollers 63 of the accumulator 14 in a zigzag course and passed between the feed pinch rollers 28.

Even after the preceding tape T has been unwound to its tail end, the tape T is continuously sent forward by the feed rollers 28. This tensions the tape T since the tail end thereof is immovable, consequently raising the tension roller 24 to rotate the brake lever 16 clockwise in FIG. 7 and move the brake shoe 23 toward the tape end sensor 17 out of contact with the flanges 11b of the rewinder 11 (FIG. 7). The approach of the brake shoe is detected by the tape end sensor 17, which in turn produces a detection signal. In response to this signal, the piston rods of the two hydraulic cylinders 45, 46 at right are advanced at the same time, and the piston rod of the accumulator operating hydraulic cylinder 66 is retracted.

When the piston rods of the two hydraulic cylinders 45, 46 for operating the joining means 13 are advanced, the holding member 33 is first pressed against the joining block 31 with the preceding tape T lapped over the following tape T and with these tapes interposed therebetween. Subsequently, the movable pressing member 32 is pressed against the joining block 31 with the two tapes T interposed therebetween, whereby the tapes T pressed by the press faces 35 and 44 of the block 31 and the pressing member 32 respectively are locally fused, and at the same time, the upper end of the resulting joint is thermally cut with the ridge 47.

Figure 8:
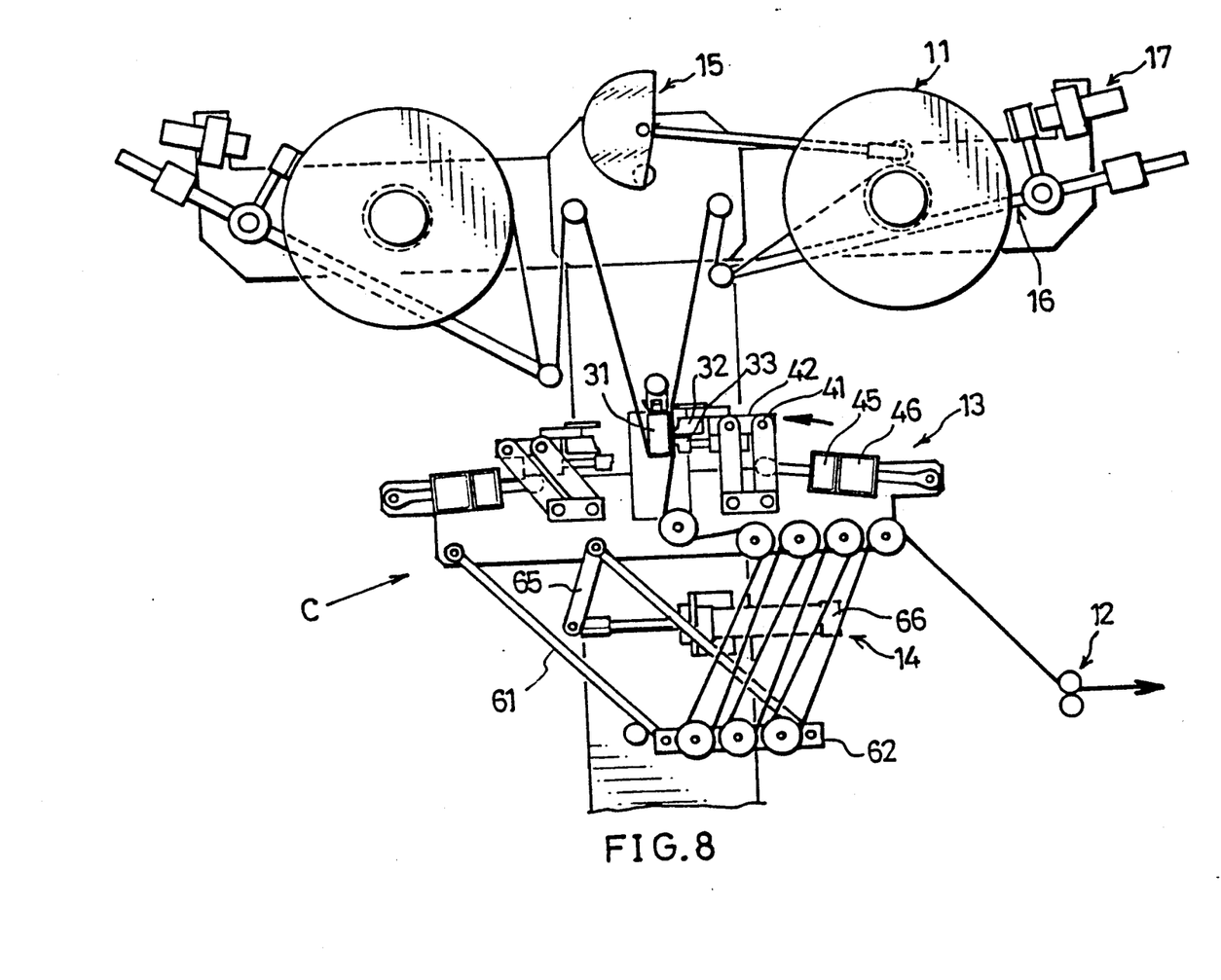
Figure 9:
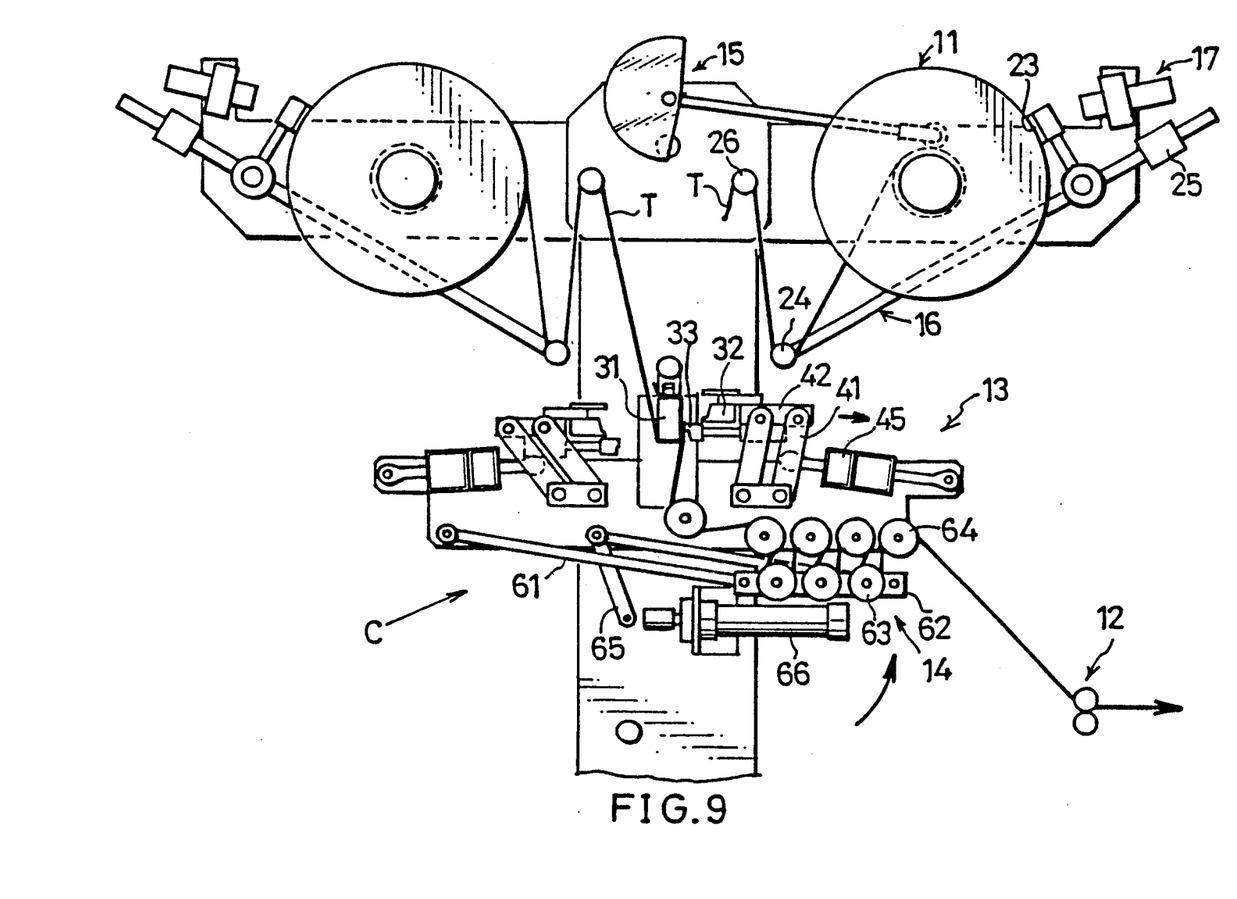
Figure 10:
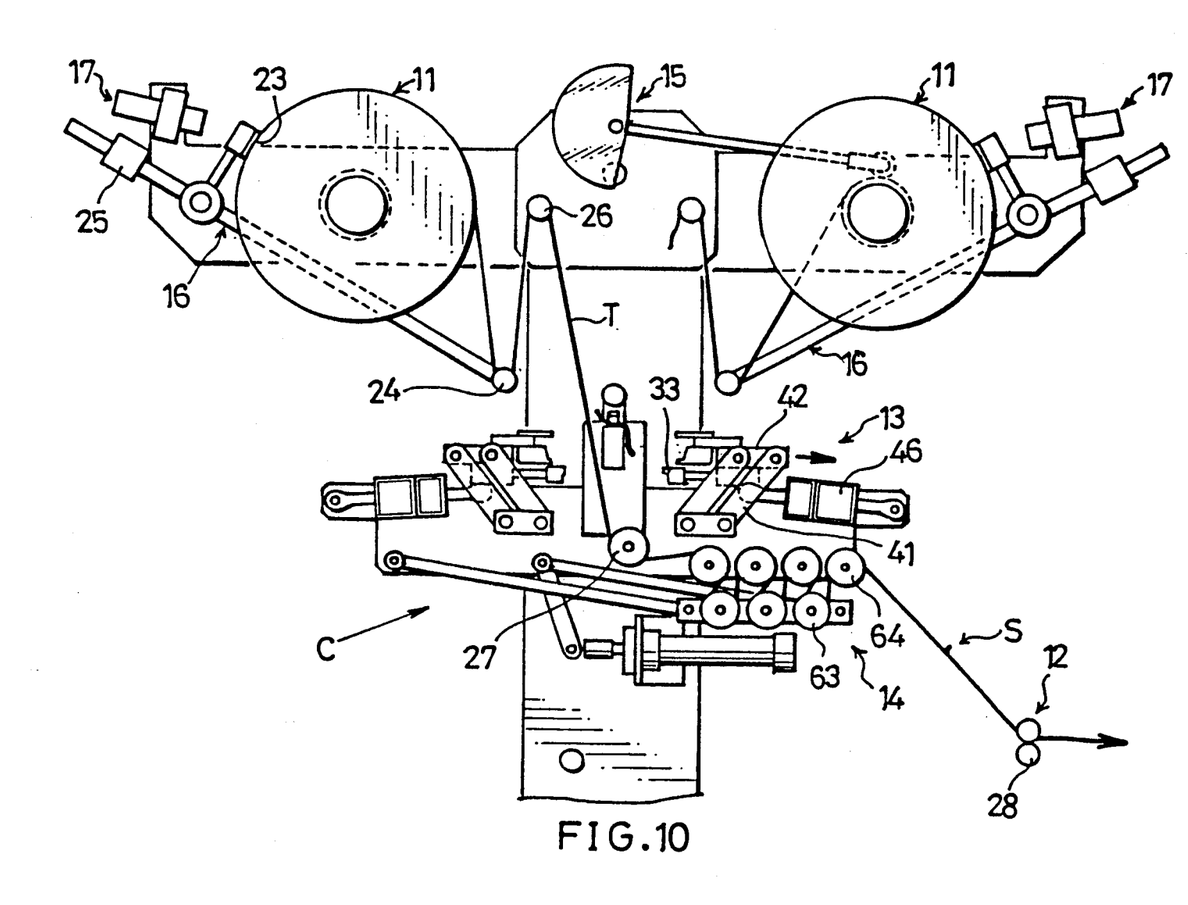

On the other hand, upon the retraction of the piston rod of the accumulator operating hydraulic cylinder 66, the lower parallel links 61 are rendered free to pivotally move in such a direction that the movable rollers 63 of the accumulator 14 move toward the fixed rollers 64 thereof (FIG. 8). When the tape joint is cut, the piston rod of one of the cylinders for operating the joining means, i.e., the cylinder 45 only, is retracted, whereby the movable pressing member 32 is released from the two tapes T, which, however, remain held by the holding member 33. In the meantime, the movable rollers 63 of the accumulator 14 move toward the fixed rollers 64 thereof, continuously feeding the the tape T to the next process (FIG. 9). While the two tapes T are being held by the holding member 33, the joint is cooled, and the two tapes T are joined together completely. The piston rod of the other hydraulic cylinder 46 for operating the joining means is retracted this time, whereby the holding member 33 is moved away from the two tapes T, whereupon the feeder 12 starts to unwind the tape T from the left rewinder 11 (FIG. 10).

After the unwinding of the following tape T has been started, the following setting work is done. This work may be performed at any time the operator is available therefor and convenient to him, before the tape T being currently unwound is completely unwound.

Figure 11:
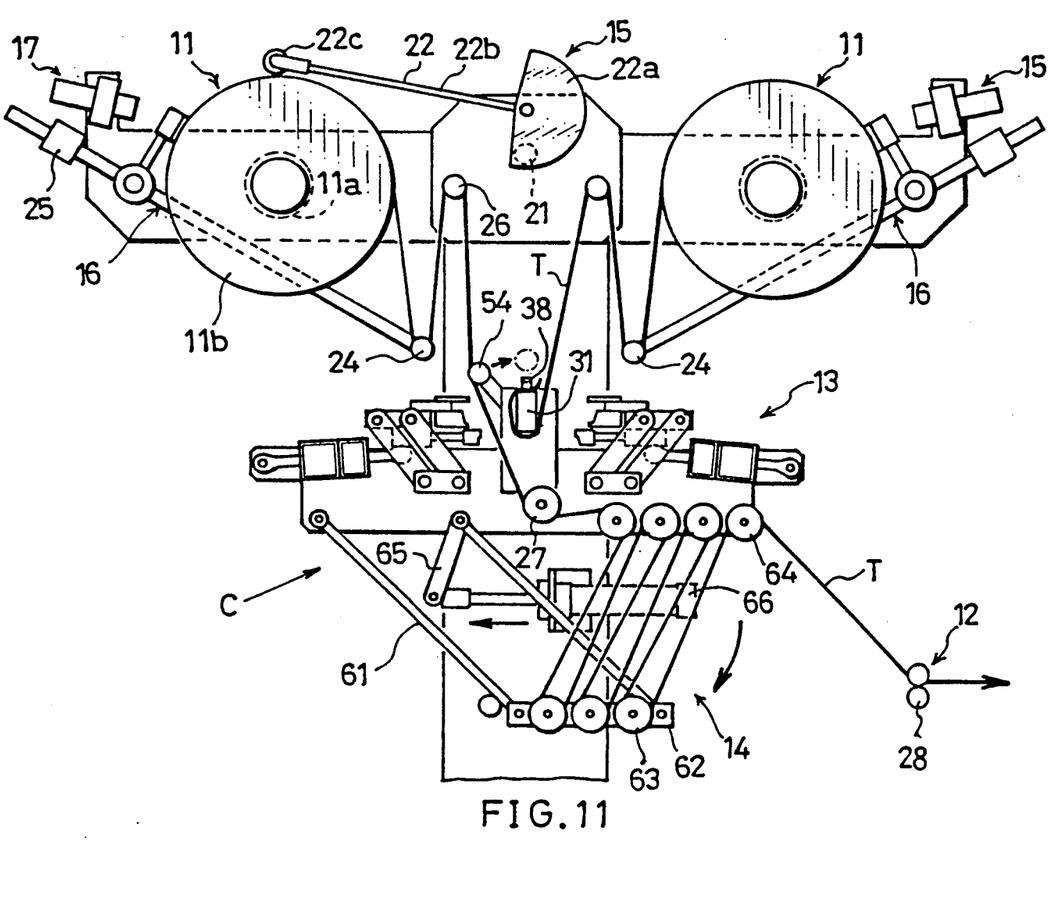

Another roll of new tape is set on the right rewinder 11, and the leading end of the tape is passed around the joining block 31 now from the right side and held to the block. In this case, the leading end of the new tape T can be held to the joining block 31 easily if the tape retracting roller 54 is tilted leftward to slightly deflect the path of unwinding of the tape T leftward. Further while the tape T at left is being unwound, the piston rod of the accumulator operating hydraulic cylinder 66 is advanced to position the movable rollers 63 at an increased distance from the fixed rollers 64 and cause the tape T to travel zigzag. The actuator pivotal arm 22b of the tape diminution sensor 15 is turned toward the new tape (FIG. 11).

Figure 12:
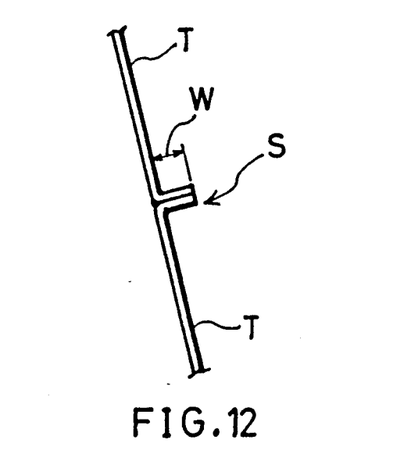
FIG. 12 is an enlarged view showing a joint in detail.

FIG. 12 shows the tape joint in greater detail. At the joint S, the two tape ends are fitted over each other and thermally bonded together in the form of a flap. The joint S has a width W, for example, of about 1.5 mm which assures a sufficient bond strength. When having such a width, the joint S passes, for example, over the rollers 63 and 64 of the accumulator 14 free of any trouble.

What is claimed is:

1. An apparatus for continuously unwinding a plurality of rolled-up tapes made of a fusible material wherein the tapes are successively unwound, one at a time, from at least two reminders for supporting the tape thereon, with a tail end of a preceding tape joined to a leading end of a following tape, the apparatus comprising:

transport means for transporting the preceding tape via a joining station; and joining means at said joining station for holding the following tape with its leading end folded into a fold and with the tail end of the preceding tape within the fold of the leading end of the following tape, thermally bonding the tail end of the preceding tape to the leading end of the following tape which has been folded over itself so as to produce a joint, and cutting off a portion of the joint with a length thereof left uncut:

the joining means comprising:

a joining block provided with a pair of vertical pressure-receiving faces opposed to each other and about which the folded-over leading end of the following tape engages from below the joining block, a pair of movable members arranged on opposite sides of the joining block and respectively movable toward and away from the pressure-receiving faces of the joining block, a pair of heaters, a heater fixedly positioned on each of the movable members and each having a heating face facing toward a pressure-receiving face of the joining block, the heating face of each heater being formed with a horizontal cutting ridge, a pair of rods being horizontally and axially movable, each of which is slidable supported by one of the movable members so as to be positioned below the heater and movable in the direction of movement of the movable member, a pair of holding members, each of which is fixed to an end of one of the rods and provided with a holding face facing toward a pressure-receiving face of the joining block, the end facing toward an end of the other rod, a pair of springs, each of which biases each of the holding members toward the joining block so that the holding member projects beyond the heater, and a hydraulic cylinder for each rod having a piston movable at a two-step stroke of a first step stroke and a second step stroke, the cylinder being operable such that after the first step stroke of the piston, the heating face of the heater on the rod is positioned away from the pressure-receiving face of the joining block while the pressure-receiving face of the holding member is pressed against the pressure-receiving face, and after the second-step stroke of the piston, both the heating face and the holding face are pressured against the pressure-receiving face.

2. An apparatus as defined in claim 1, further comprising a tape end sensor which detects the tail end of the preceding tape, one of the hydraulic cylinders operating in response to a detection signal from the tape end sensor.

3. An apparatus as defined in claim 1, wherein the transport means comprises two upper guide rollers arranged above the joining station and horizontally spaced apart from each other for guiding the preceding tape and the following tape individually, and a lower guide roller disposed below the joining station for guiding the preceding tape.

4. An apparatus as defined in claim 3, further including feed rollers arranged downstream from the lower guide roller, and an accumulator for slackening the tape to be fed between the lower guide roller and the feed rollers.

5. An apparatus as defined in claim 3, wherein the transport means comprises two rewinders, each of the rewinders comprising a drum disposed at one side of the upper guide roller and having the tail end of the tape fixed thereto, and a flange having an outer periphery at each end of the drum; a brake lever having at one end thereof a brake shoe in contact with the outer periphery of the flange and having at the other end thereof a tension roller bearing on the tape between the upper guide roller and the drum; and a tape end sensor including a proximity switch for detecting the tail end of the preceding tape by detecting a pivotal movement of the brake lever in a direction to move the brake shoe away from the outer periphery of the flange.

* * * * *